(12) United States Patent
Yamaguchi et al.

(10) Patent No.: US 7,862,235 B2
(45) Date of Patent: Jan. 4, 2011

(54) LINEAR GUIDE DEVICE

(75) Inventors: Hiroki Yamaguchi, Fujisawa (JP);
Nobuhide Kurachi, Fujisawa (JP);
Yoshinori Mizumura, Fujisawa (JP)

(73) Assignee: NSK Ltd., Tokyo (JP)

( * ) Notice: Subject to any disclaimer, the term of this patent is extended or adjusted under 35 U.S.C. 154(b) by 699 days.

(21) Appl. No.: 11/793,455

(22) PCT Filed: May 12, 2006

(86) PCT No.: PCT/JP2006/309604
§ 371 (c)(1),
(2), (4) Date: Jun. 20, 2007

(87) PCT Pub. No.: WO2006/121167
PCT Pub. Date: Nov. 16, 2006

(65) Prior Publication Data
US 2008/0138002 A1    Jun. 12, 2008

(30) Foreign Application Priority Data

| May 12, 2005 | (JP) | ............................ 2005-140047 |
| May 12, 2005 | (JP) | ............................ 2005-140049 |
| Apr. 26, 2006 | (JP) | ............................ 2006-122341 |
| Apr. 26, 2006 | (JP) | ............................ 2006-122342 |
| May 11, 2006 | (JP) | ............................ 2006-132635 |
| May 11, 2006 | (JP) | ............................ 2006-132636 |

(51) Int. Cl.
*F16C 29/06* (2006.01)

(52) U.S. Cl. .......................................... 384/45; 384/13
(58) Field of Classification Search .................. 384/13, 384/43–45
See application file for complete search history.

(56) References Cited

U.S. PATENT DOCUMENTS 4,428,627 A    1/1984   Teramachi (Continued)

FOREIGN PATENT DOCUMENTS

JP    58-152928 A    9/1983

(Continued)

OTHER PUBLICATIONS

Form PCT/IB/338 (one (1) page); Form PCT/IB/373 (one (1) page); Form PCT/ISA/237 (four (4) pages) totaling (six (6) pages).

(Continued)

*Primary Examiner*—Thomas R Hannon
(74) *Attorney, Agent, or Firm*—Crowell & Moring LLP

(57) ABSTRACT

In a linear guide device, a rolling element cage 24 holding balls interposed between a rail side rolling element rolling groove and a slider side rolling element rolling groove is formed of a synthetic resin material, and has two plate parts 244 facing to each other with a slider body being held therebetween. The rolling element cage 24 has a positioning part that makes contact with the inside surface of the slider body and is positioned on the slider body by the positioning part with respect to the slider.

14 Claims, 17 Drawing Sheets

U.S. PATENT DOCUMENTS

| | | |
|---|---|---|
| 5,755,516 A | 5/1998 | Teramachi et al. |
| 5,829,883 A * | 11/1998 | Kawaguchi et al. ........... 384/45 |
| 5,951,168 A | 9/1999 | Teramachi et al. |
| 6,132,093 A | 10/2000 | Michioka et al. |
| 7,134,790 B2 * | 11/2006 | Wang et al. ................... 384/45 |
| 7,632,017 B2 * | 12/2009 | Akiyama et al. .............. 384/45 |
| 2002/0136472 A1 | 9/2002 | Mochizuki et al. |

FOREIGN PATENT DOCUMENTS

| | | |
|---|---|---|
| JP | 59-181331 U | 12/1984 |
| JP | 62-15623 U | 1/1987 |
| JP | 6-14544 U | 2/1994 |
| JP | 7-317762 A | 12/1995 |
| JP | 2542067 Y2 | 4/1997 |
| JP | 11-72119 A | 3/1999 |
| JP | 2002-54633 A | 2/2002 |

OTHER PUBLICATIONS

International Search Report dated Aug. 15, 2006 (Two (2) pages).
Japanese Office Action dated Sep. 7, 2010 including English translation (Four (4) pages).
Japanese Office Action dated Sep. 14, 2010 including English translation (Eight (8) pages).
Japanese Office Action dated Sep. 14, 2010 including English translation (Five (5) pages).
Japanese Office Action dated Sep. 14, 2010 including English translation (Six (6) pages).
Japanese Office Action dated Sep. 14, 2010 including English translation (Four (4) pages).
Japanese Official Decision to Grant a Patent dated Sep. 14, 2010 including English translation (Five (5) pages).

* cited by examiner

F I G. 4
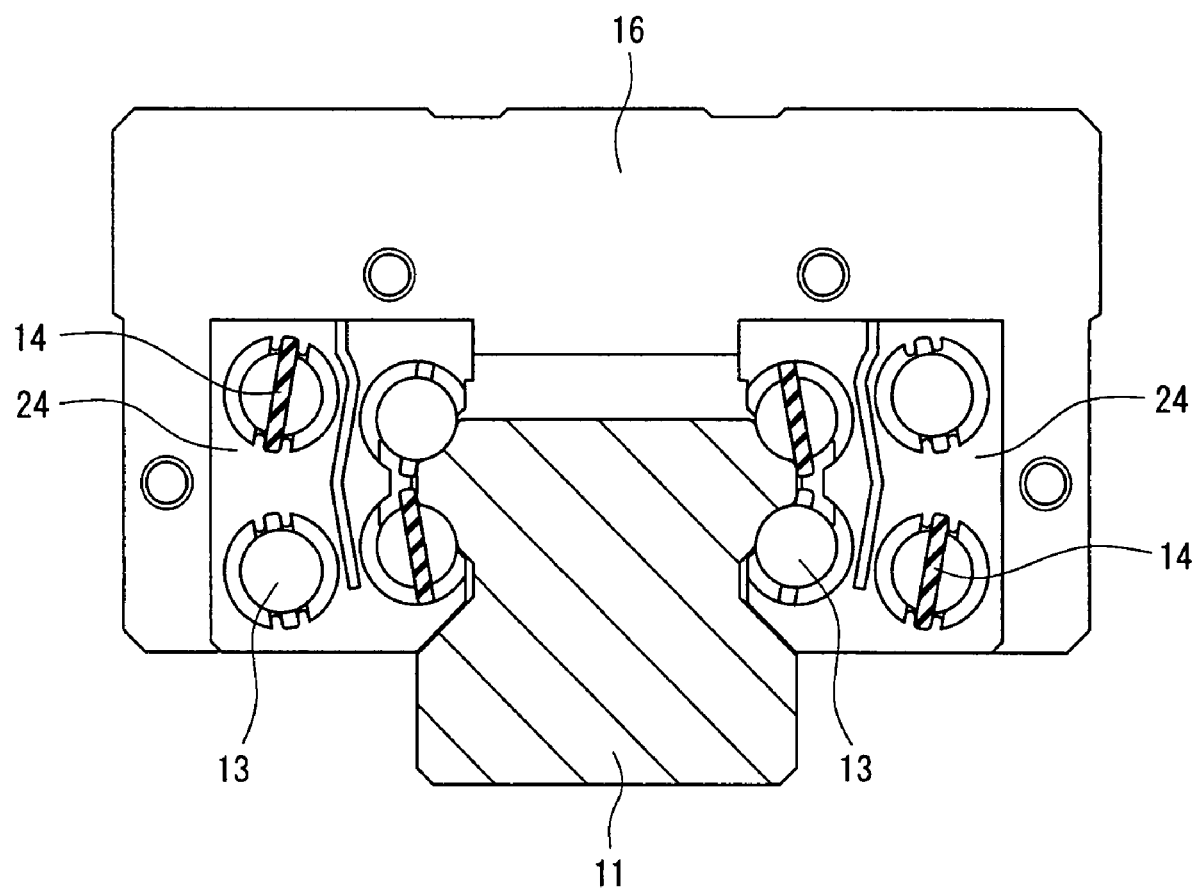

LINEAR GUIDE DEVICE

TECHNICAL FIELD

The present invention relates to a linear guide device for guiding an object performing reciprocating linear motion in the movement direction thereof.

BACKGROUND ART

A linear guide device for guiding an object performing reciprocating linear motion in the movement direction thereof is generally configured so as to comprise a guide rail formed in a straight line shape, a slider relatively moving in the lengthwise direction of the guide rail, and a large number of rolling elements rollably incorporated in the slider. The slider includes a slider body having a plurality of slider side rolling element rolling grooves facing to a plurality of rail side rolling element rolling grooves formed on the guide rail, a pair of end caps mounted at one end and the other end of the slider body, a plurality of return guides that form between the end caps and the return guides a direction change path communicating with a rolling element load rolling path formed between the rail side rolling element rolling groove and the slider side rolling element rolling groove and communicating with a rolling element return passage formed in the slider body, and a plurality of rolling element holding members for holding the rolling elements interposed between the rail side rolling element rolling groove and the slider side rolling element rolling groove.

Such a rolling element holding member of the slider is conventionally formed of a metallic material, which poses a problem in that metal contact easily occurs between the rolling elements. To solve this problem, a device in which the rolling element holding member is resin molded integrally with the return guide has been devised (for example, refer to JP-UM-A-59-181331 and JP-A-11-72119).

However, if the rolling element holding member is resin molded integrally with the return guide, since the return guide has a larger thickness than the rolling element holding member, deformation easily occurs due to a sink mark at the time of resin molding. If a thickness engraved part is formed on the back side of the return guide to prevent the above deformation, the construction of a mold used when the rolling element holding member and the return guide are resin molded becomes complicated, which poses a problem of increased cost etc.

Also, in the linear guide device disclosed in JP-A-11-72119, the return guide resin molded integrally with the rolling element holding member projects to the rolling element return passage. Therefore, it is necessary to assemble the rolling element holding member integrated with the return guide to the slider body before a rolling element return passage forming member for guiding a space holding belt that keeps the space between the rolling elements at a space before the rolling element holding member is inserted in the rolling element return passage such that the rolling elements do not interfere with each other, which poses a problem of impaired assembling ability of the slider.

DISCLOSURE OF THE INVENTION

Accordingly, an object of the present invention is to provide a linear guide device that can improve the productivity and assembling ability without a decrease in operability, noise characteristics, and durability and also can reduce the cost.

A linear guide device in accordance with the present invention comprises a guide rail formed into a straight line shape; a slider relatively moving in the lengthwise direction of the guide rail; and a large number of rolling elements rollably incorporated in the slider, the slider including a slider body having a plurality of slider side rolling element rolling grooves facing to a plurality of rail side rolling element rolling grooves formed on the guide rail; a pair of end caps mounted at one end and the other end of the slider body; a plurality of return guides that form between the end caps and the return guides a direction change path communicating with a rolling element load rolling path formed between the rail side rolling element rolling groove and the slider side rolling element rolling groove and communicating with a rolling element return passage formed in the slider body; and a pair of rolling element cages for holding the rolling elements interposed between the rail side rolling element rolling groove and the slider side rolling element rolling groove, and is characterized in that the rolling element cage has two plate parts facing to each other with the slider body being held therebetween.

In the liner guide device in accordance with the present invention, the plate part of the rolling element cage preferably forms a supply path for lubricating oil between the return guide and the plate part. Also, the rolling element cage preferably has a positioning part which makes contact with or engages with at least one of the slider body, the end cap, and the return guide.

Also, in the liner guide device in accordance with the present invention, a semicylindrical or cylindrical rolling element return passage forming member is preferably provided in a through hole provided in the slider.

Also, in the liner guide device in accordance with the present invention, the rolling element cage preferably has a positioning part for positioning the rolling element return passage forming member. Further, it is preferable that the rolling element cage has a positioning part which makes contact with the inner surface portion of the slider body formed with the slider side rolling element rolling groove, and also has a positioning part which makes contact with or engages with at least one of the end cap, the return guide, and the rolling element return passage forming member.

Also, it is preferable that the slider side rolling element rolling grooves be formed on an upper portion and a lower potion of the inside surface of the slider body, and the rolling element cage has at least one of a part arranged on the upper side of the rolling element rolling groove formed on the upper portion of the inside surface of the slider body, a part arranged between the rolling element rolling groove formed on the upper portion of the inside surface of the slider body and the rolling element rolling groove formed on the lower portion of the inside surface of the slider body, and a part arranged on the lower side of the rolling element rolling groove formed on the lower portion of the inside surface of the slider body.

Also, the rolling element cage may have a plurality of rolling element holding parts formed in parallel with each other along the slider side rolling element rolling groove. Also, the rolling element holding part of the rolling element cage preferably has at least one notch part or a concave part in the lengthwise direction of the rolling element holding part, and the notch part or the concave part is preferably provided in a joint portion between the rolling element holding part and the plate part of the rolling element cage.

Also, in the linear guide device in accordance with the present invention, the end cap or the return guide preferably has a positioning part with respect to the slider body. Further, the rolling element return passage forming member preferably has a positioning part with respect to the slider body.

Also, in the linear guide device in accordance with the present invention, at least a part of the rolling element holding part of the rolling element cage preferably makes contact with an inner surface portion of the slider body. Also, the return guide is preferably resin molded integrally with the rolling element return passage forming member.

BRIEF DESCRIPTION OF THE DRAWINGS

FIG. 4 is a sectional view taken along the line IV-IV of FIG. 2;

BEST MODE FOR CARRYING OUT THE INVENTION

A first embodiment of the present invention will now be described with reference to FIGS. 1 to 15.

Figure 1:
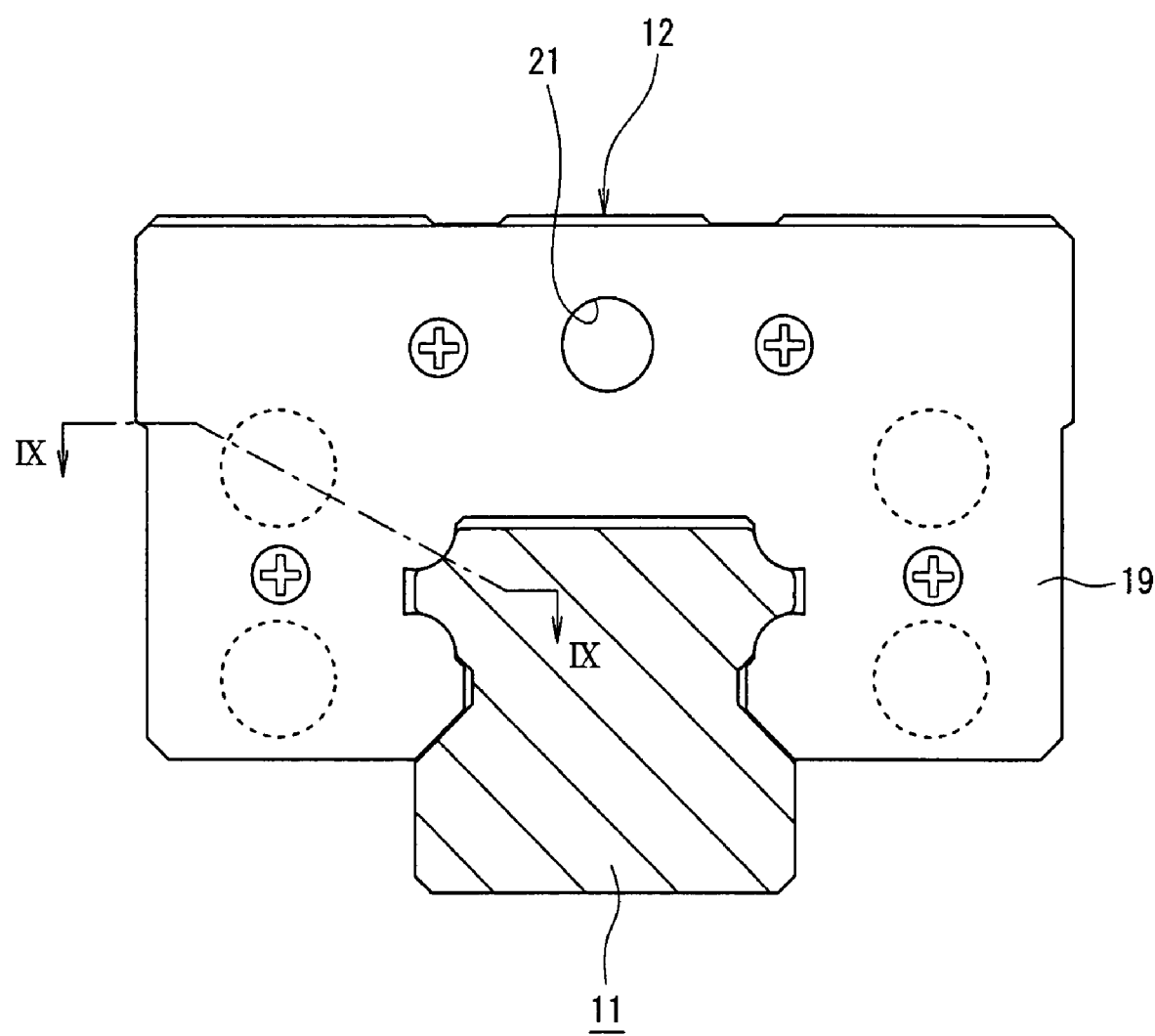
FIG. 1 is a front view of a linear guide device in accordance with a first embodiment of the present invention.
Figure 2:
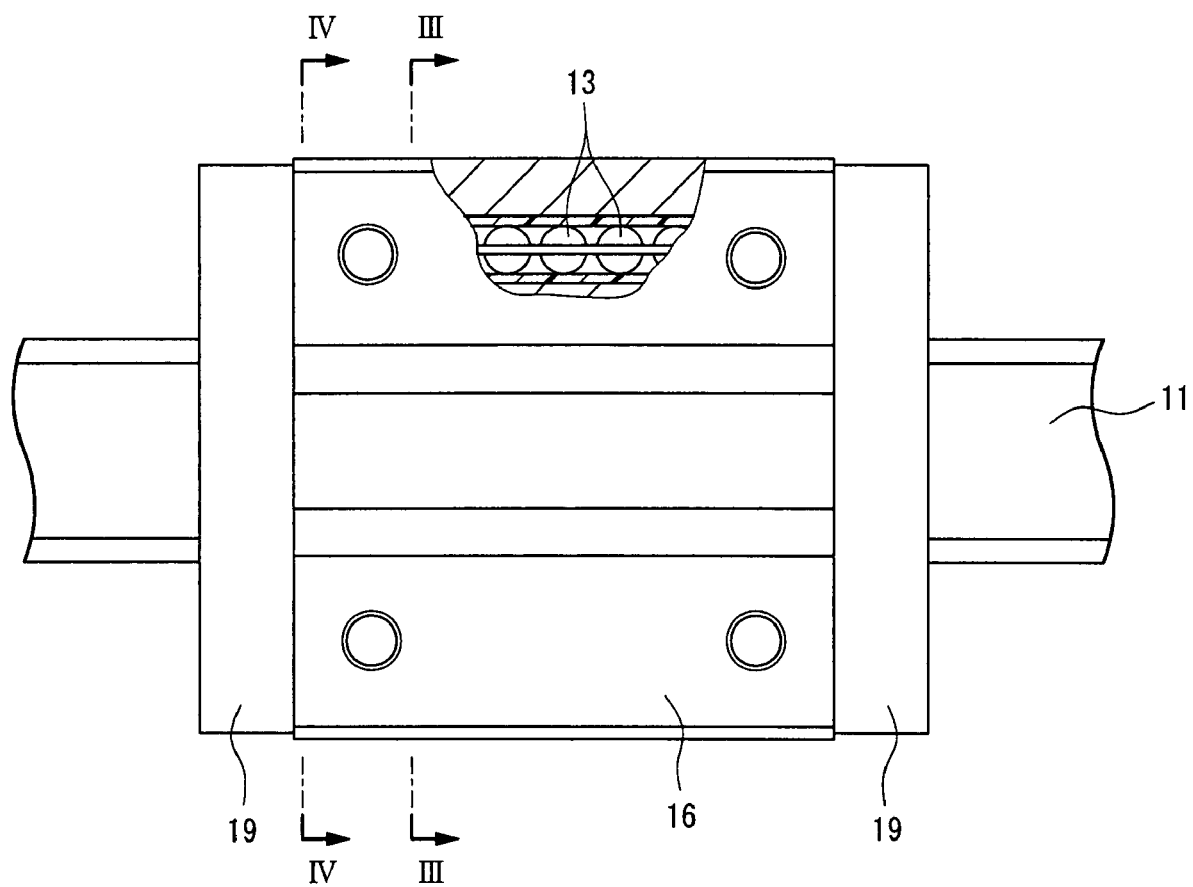
FIG. 2 is a plan view of the linear guide device shown in FIG. 1.

In FIGS. 1 and 2, a linear guide device in accordance with the first embodiment of the present invention comprises a guide rail 11 formed in a straight line shape, a slider 12 relatively moving in the lengthwise direction of the guide rail 11, a large number of balls 13 serving as rolling elements rollably incorporated in the slider 12, and four space holding belts 14 (refer to FIGS. 3 and 4) that keep the space between the balls 13 at a space such that the rolling elements do not interfere with each other.

Figure 5:
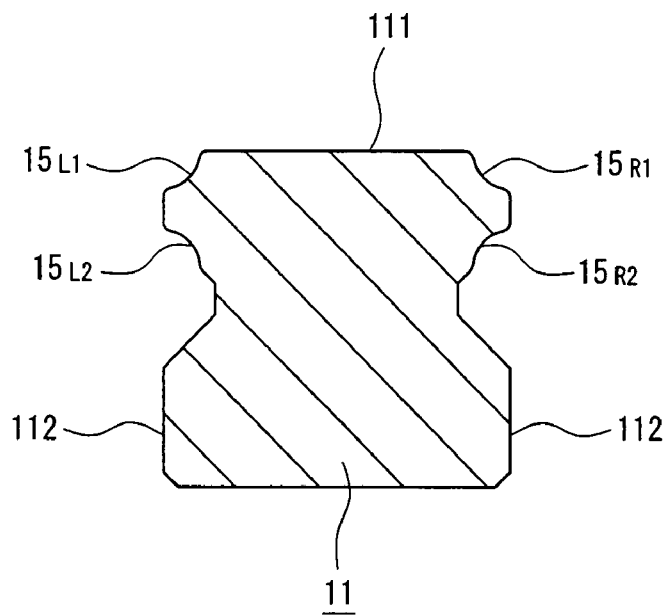
FIG. 5 is a sectional view of a guide rail shown in FIG. 1.
Figure 6:
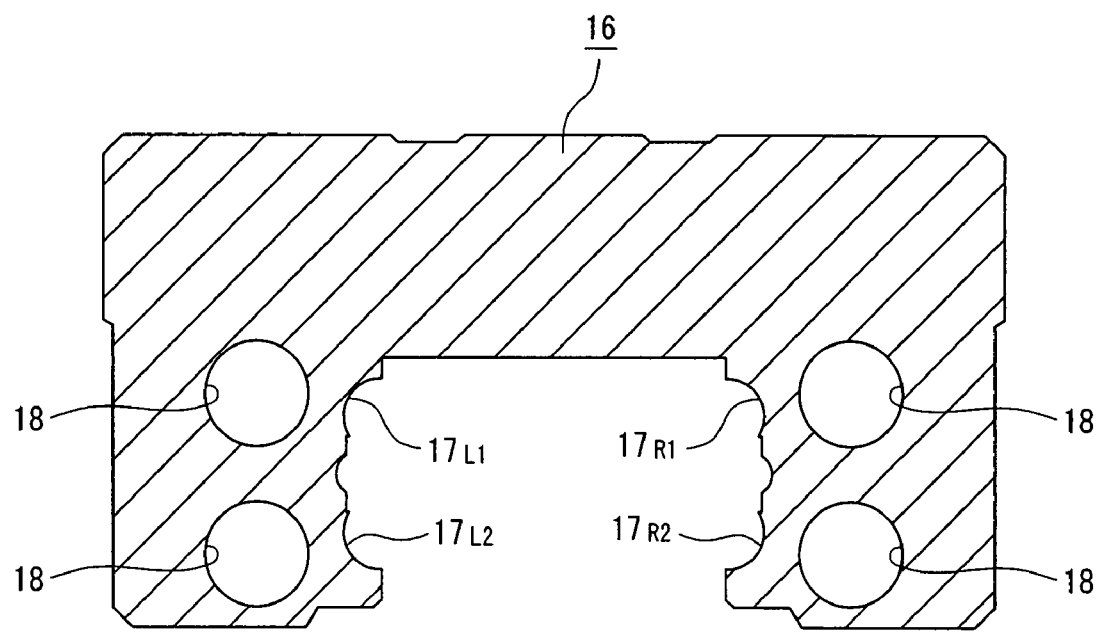
FIG. 6 is a sectional view of a slider body shown in FIG. 2.

The guide rail 11 is formed of a metallic material such as steel, and has rail side rolling element rolling grooves 15L1, 15L2, 15R1 and 15R2 (refer to FIG. 5). Of the rail side rolling element rolling grooves 15L1 to 15R2, the two rail side rolling element rolling grooves 15L1 and 15R1 are formed along the lengthwise direction of the guide rail 11 at intersection portions of an upper surface part 111 and left and right side surface parts 112 of the guide rail 11. The remaining two rail side rolling element rolling grooves 15L2 and 15R2 are formed along the lengthwise direction of the guide rail 11 on the left and right side surface parts 112 of the guide rail 11.

Figure 7:
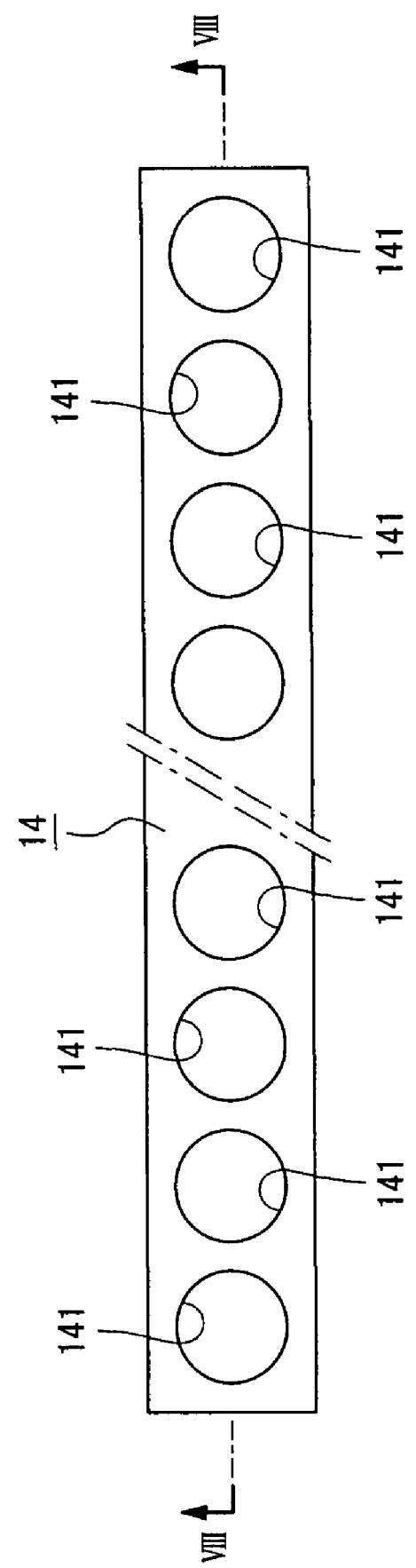
FIG. 7 is a plan view of a space holding belt shown in FIG. 3.
Figure 8:
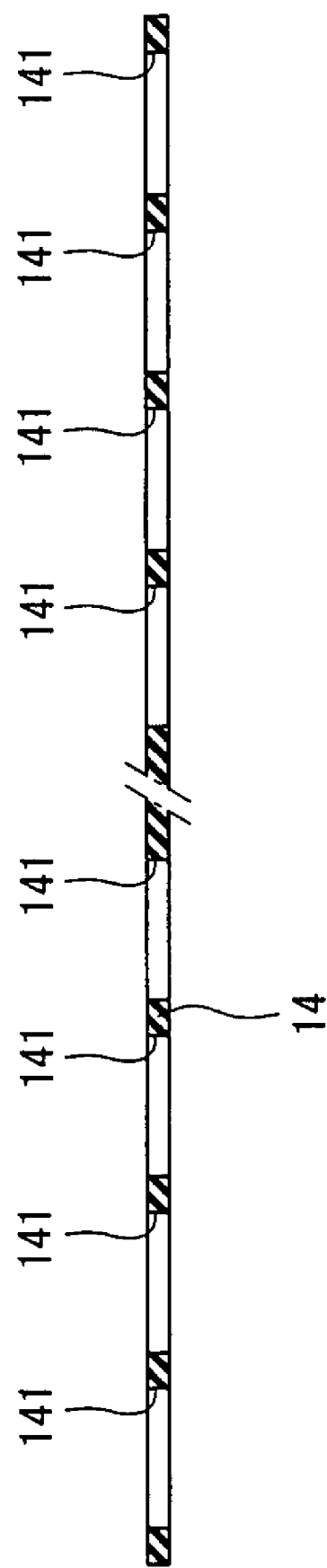
FIG. 8 is a sectional view taken along the line VIII-VIII of FIG. 7.
Figure 9:
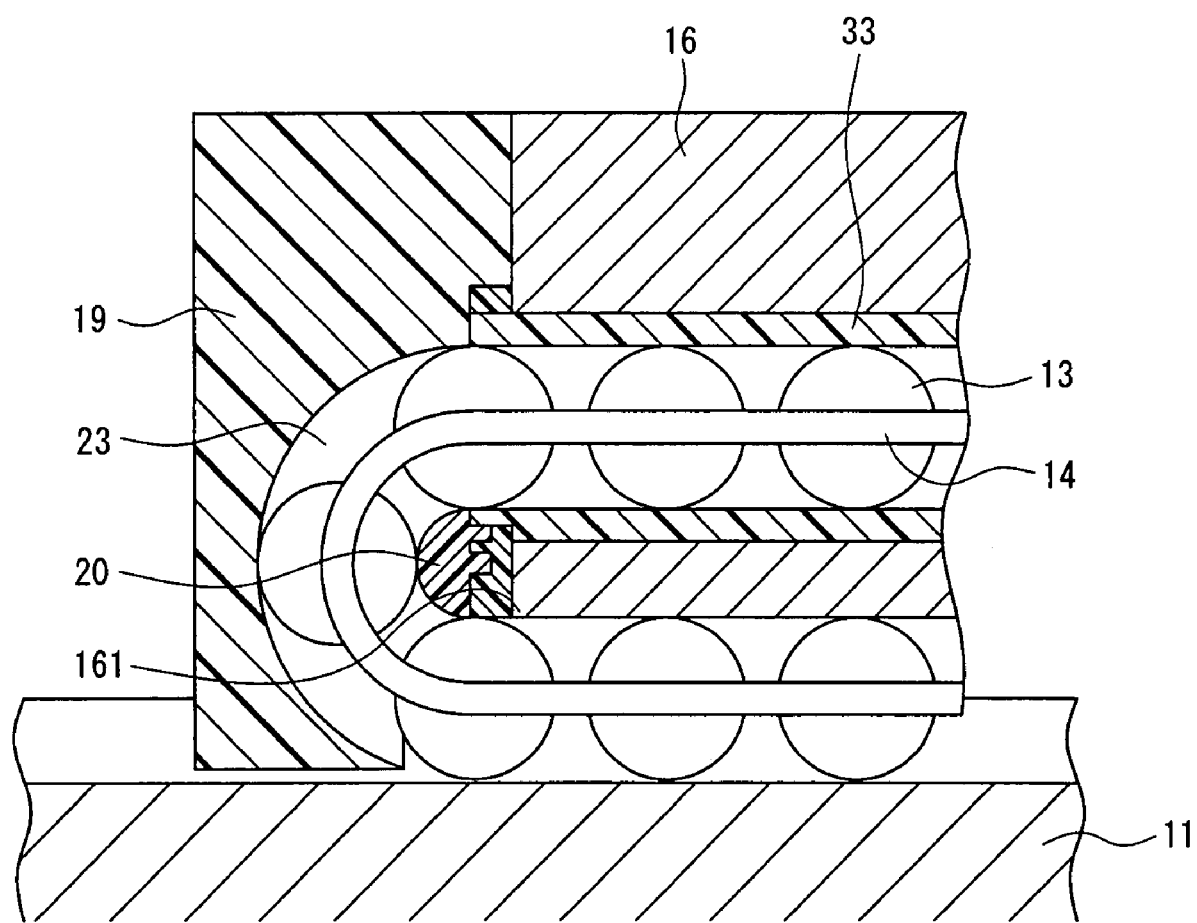
FIG. 9 is a sectional view taken along the line IX-IX of FIG. 1.

The space holding belt 14 is formed of a soft material such as thermoplastic elastomer, and has a large number of ball housing holes 141 each of which houses one ball 13 (refer to FIGS. 7 and 8).

The slider 12 has a slider body 16 as shown in FIG. 2. The slider body 16 is formed of a metallic material such as steel, and has slider side rolling element rolling grooves 17L1, 17L2, 17R1 and 17R2 facing to the rail side rolling element rolling grooves 15L1, 15L2, 15R1 and 15R2, respectively (refer to FIG. 6). The slider side rolling element rolling grooves 17L1 and 17R1 are formed on the upper portion of the inside surface of the slider body 16, and the slider side rolling element rolling grooves 17L2 and 17R2 are formed on the lower portion of the inside surface of the slider body 16. The slider 12 also has four rolling element return passages 18 for returning the balls 13 rolling in rolling element load rolling path between the rail side rolling element rolling grooves 15L1, 15L2, 15R1 and 15R2 and the slider side rolling element rolling grooves 17L1, 17L2, 17R1 and 17R2 (refer to FIG. 6). The rolling element return passages 18 are formed in the slider body 16 in parallel with the slider side rolling element rolling grooves 17L1 to 17R2.

The slider 12 further has a pair of end caps 19 (refer to FIG. 2) mounted at one end and the other end of the slider body 16, and four return guides 20 (refer to FIGS. 9 and 10) incorporated in the end caps 19, two return guides 20 being provided in one end cap 19. The end cap 19 is formed of a synthetic resin material, and has a grease nipple mounting hole 21 and an oil supply path forming groove 22 forming an oil supply path for lubricating oil supplied from the grease nipple mounting hole 21 between the end cap 19 and the slider body 16 (refer to FIG. 10). The return guide 20 is formed of a synthetic resin material like the end cap 19, and forms a direction change path 23 (refer to FIG. 9) curved substantially in a U shape between the end cap 19 and the return guide 20.

The direction change path 23 communicates with the rolling element load rolling path between the rail side rolling element rolling grooves 15L1 to 15R2 and the slider side rolling element rolling grooves 17L1 to 17R2, and also communicates with the rolling element return passage 18. Therefore, the ball 13 rolling in the rolling element load rolling path along with the relative linear motion of the slider 12 changes its direction in the direction change path 23 formed between the end cap 19 and the return guide 20, and then rolls in the rolling element return passage 18.

Figure 3:
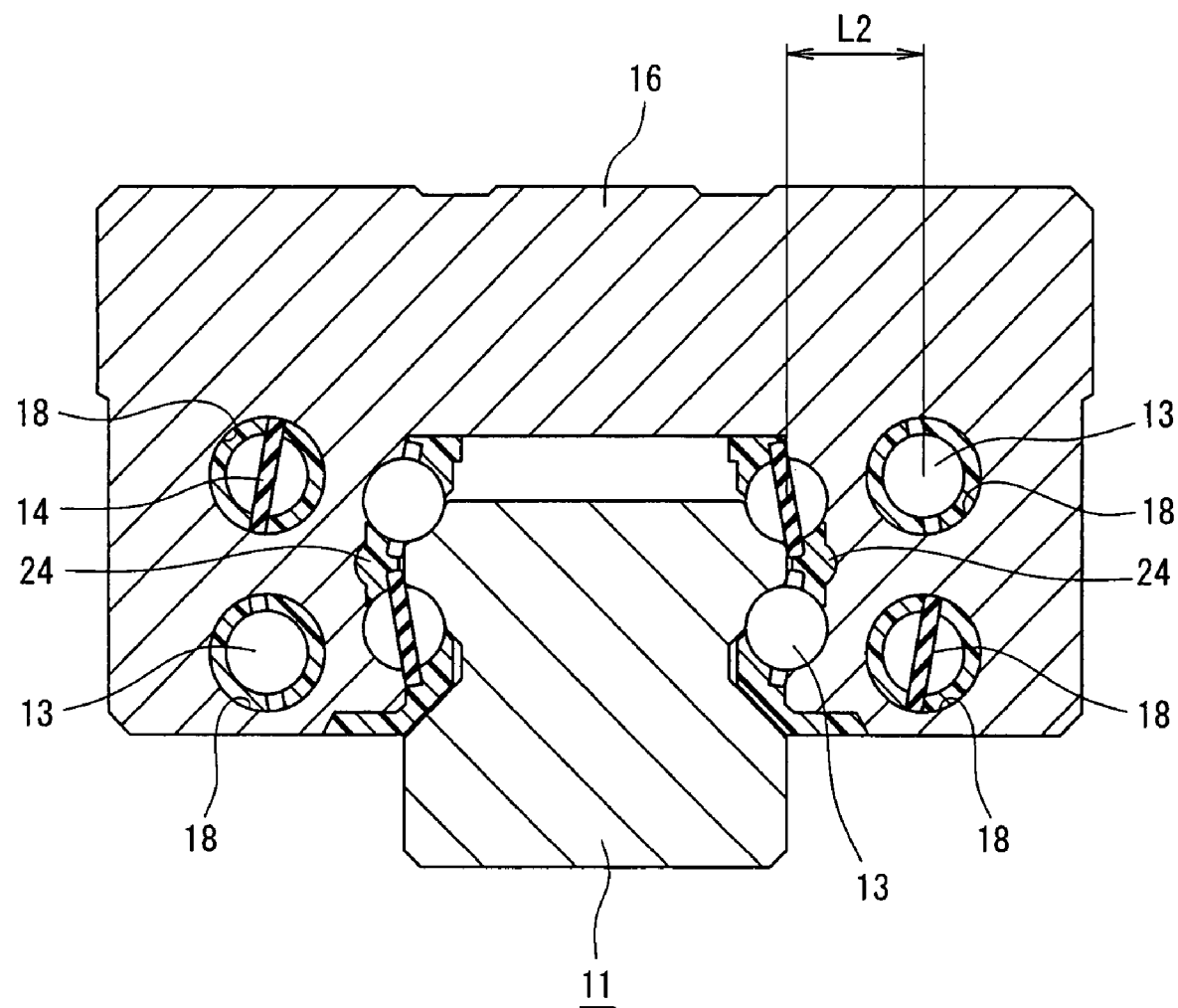
FIG. 3 is a sectional view taken along the line III-III of FIG. 2.

The slider 12 further has a pair of rolling element cages 24 (refer to FIGS. 3 and 4). Each of the rolling element cages 24 is formed of a synthetic resin material, and has three rolling element holding parts 241, 242 and 243 for holding the balls 13 interposed between the rail side rolling element rolling grooves 15L1 to 15R2 and the slider side rolling element rolling grooves 17L1 to 17R2.

The rolling element holding parts 241, 242 and 243 of the rolling element cage 24 are formed in parallel with each other along the slider side rolling element rolling grooves 17L1 to 17R2 and make contact with the inner surface portion of the slider body 16 formed with the slider side rolling element rolling grooves 17L1 to 17R2. The rolling element holding part 241 of the rolling element cage 24 is formed at the upper stage of the rolling element holding part 242. On the other hand, the rolling element holding part 243 of the rolling element cage 24 is formed at the lower stage of the rolling element holding part 242, and has a bent part 243c.

Figure 11:
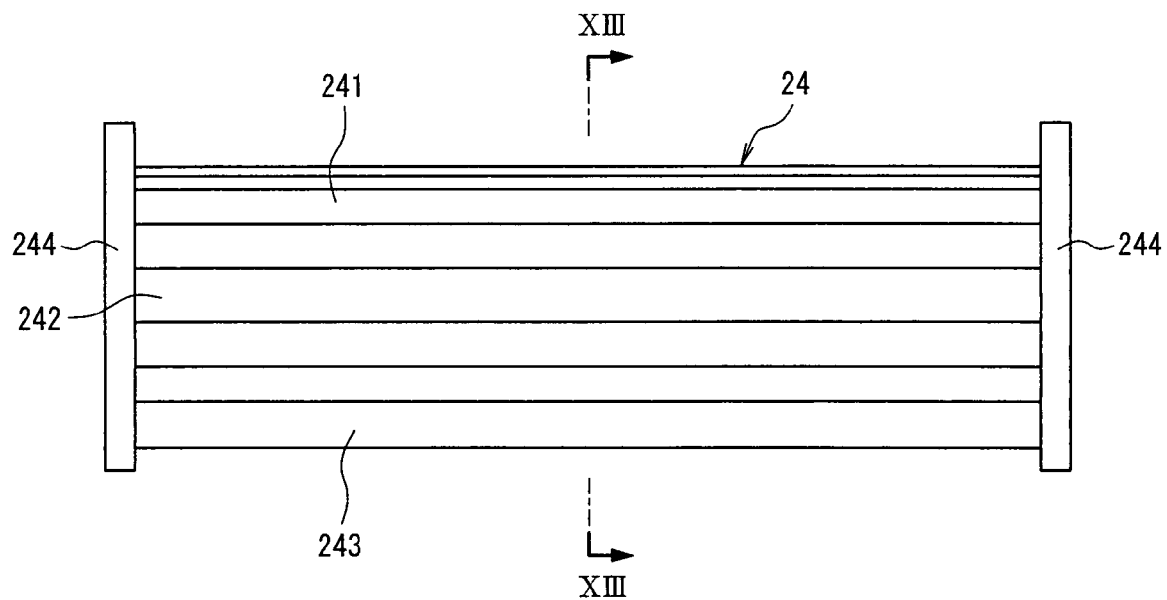
FIG. 11 is a front view of a rolling element cage shown in FIG. 3.

The rolling element cage 24 also has two plate parts 244 facing to each other with the slider body 16 being held therebetween, the plate parts 244 being provided in one end portion and the other end portion of the rolling element holding parts 241, 242 and 243 (refer to FIG. 11). The plate part 244 is formed at right angles to the lengthwise direction of the rolling element holding parts 241, 242 and 243, and makes contact with the end surface portion of the slider body 16 mounted with the end cap 19.

The return guide 20 makes contact with the plate part 244 of the rolling element cage 24, and between the plate part 244 and the return guide 20, a lubricating oil supply path for supplying lubricating oil to the balls 13 incorporated in the slider 12 is formed by an oil supply path forming groove 25 (refer to FIG. 12) provided in the plate part 244 of the rolling element cage 24.

The plate part 244 of the rolling element cage 24 has two rolling element passage forming parts 26 (refer to FIG. 12) forming rolling element passages between the rolling element load rolling path between the rail side rolling element rolling grooves 15L1 to 15R2 and the slider side rolling element rolling grooves 17L1 to 17R2 and the direction change path 23. Each of the rolling element passage forming parts 26 is formed by cutting the plate part 244 of the rolling element cage 24 into an arc shape with a radius of curvature larger than the radius of the ball 13. On the other hand, the end cap 19 has four positioning protrusions (positioning parts) 27 (refer to FIG. 10) each of which engages with the rolling element passage forming part 26 and makes contact with the inner surface portion of the slider body 16 to position the end cap 19 with respect to the slider body 16.

Figure 12:
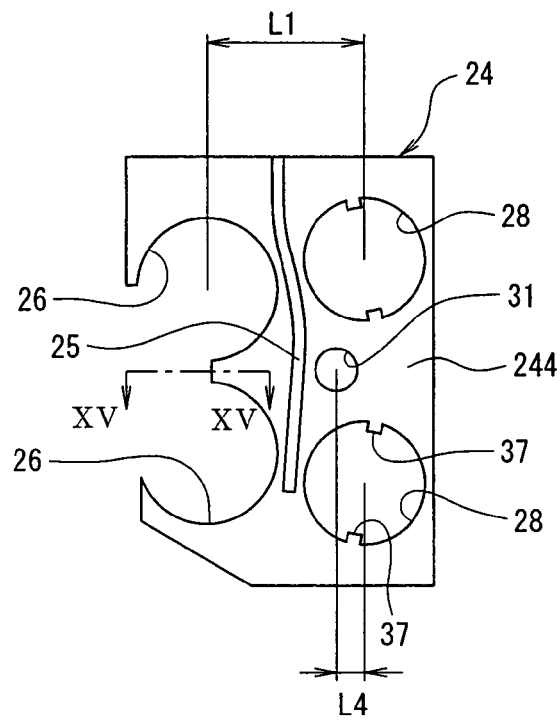
FIG. 12 is a side view of the rolling element cage shown in FIG. 11.
Figure 13:
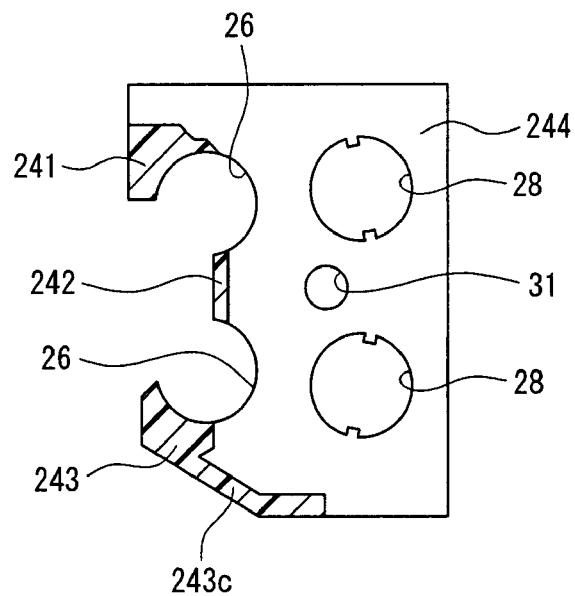
FIG. 13 is a sectional view taken along the line XIII-XIII of FIG. 11.

The plate part 244 of the rolling element cage 24 also has two passage connection holes 28 each of which connects the rolling element return passage 18 to the direction change path 23 (refer to FIG. 12). The passage connection hole 28 is formed into a circular shape with a radius of curvature larger than the radius of the ball 13. On the other hand, the end cap 19 and the return guides 20 have semicylindrical positioning protrusions (positioning parts) 29 and 30 that engage with the passage connection holes 28 and the rolling element return passages 18 to position the end cap 19 and the return guides 20 with respect to the slider body 16 (refer to FIG. 10).

Taking the distance between the centers of the rolling element passage forming part 26 and the passage connection hole 28 as L1 (refer to FIG. 12) and the distance from the center of the slider side rolling element rolling groove to the center of the rolling element return passage as L2 (refer to FIG. 3), the passage connection holes 28 are formed in the plate parts 244 of the rolling element cage 24 so that L1<L2.

As shown in FIG. 12, the plate part 244 of the rolling element cage 24 has a positioning through hole 31. On the other hand, the return guide 20 that is in contact with the plate part 244 of the rolling element cage 24 has a positioning protrusion (positioning part) 32 that engages with the positioning through hole 31 to position the return guide 20 with respect to the slider body 16 (refer to FIG. 10). In this case, the end surface portion of the slider body 12 with which the plate part 244 of the rolling element cage 24 makes contact preferably has a bottomed positioning hole engaging with the positioning protrusion 32.

Taking the distance between the centers of the passage connection hole 28 and the positioning through hole 31 formed in the plate part 244 of the rolling element cage 24 as L4 (refer to FIG. 12) and the distance between the centers of the positioning protrusion 32 and the semicylindrical positioning protrusion 30 as L3 (refer to FIG. 10), the positioning protrusion 32 is provided on the return guide 20 so that the relationship of L3<L4 holds. In order to prevent the rolling element holding parts 241 to 244 of the rolling element cage 24, which are pressed against the inner surface portion of the slider body 16, from being deformed greatly or being damaged, the difference between L3 and L4 should desirably be 0.2 mm or small.

The slider 12 further has rolling element return passage forming members 33 (refer to FIGS. 3 and 4) in the rolling element return passages (through holes) 18. Each of the rolling element return passage forming members 33 consists of two sleeve half members 34 (refer to FIG. 14) each formed by dividing a resin-made sleeve into halves, and is inserted in the rolling element return passage (through hole) 18 of the slider body 16.

Figure 14:
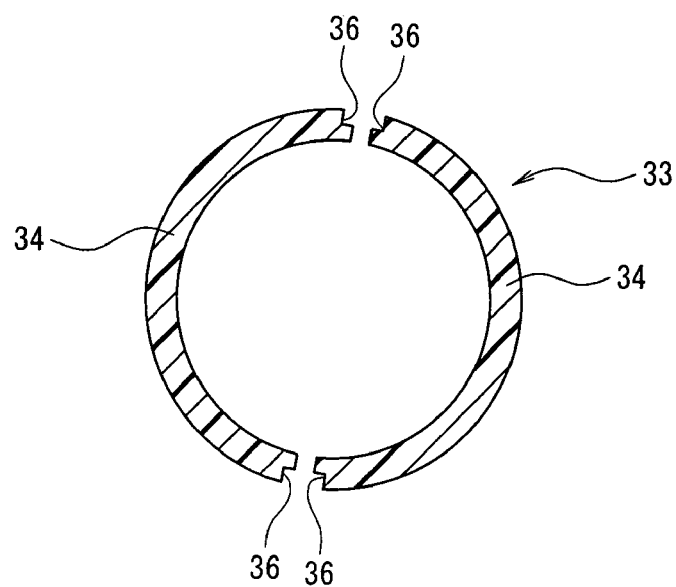
FIG. 14 is a sectional view of a rolling element return passage forming member shown in FIG. 3.
Figure 15:
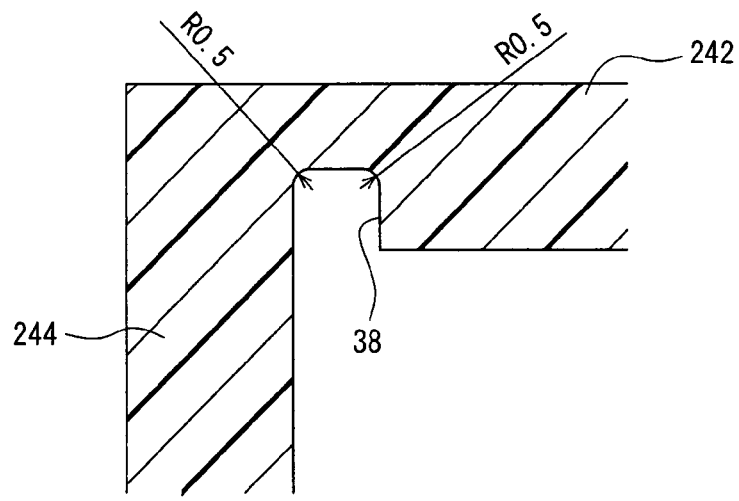
FIG. 15 is a sectional view taken along the line XV-XV of FIG. 12.

The sleeve half member 34 has positioning parts 36, 36 (refer to FIG. 14). On the other hand, the plate part 244 of the rolling element cage 24, which engages with the end portions of the sleeve half members 34, has positioning parts 37 that engage with the positioning parts 36 or the outer peripheral portions of the sleeve half members to position the sleeve half members 34 with respect to the passage connection holes 28 or the inner peripheral portion (refer to FIG. 12).

The slider body 16 has an edge part 161 (refer to FIG. 9) in a corner portion of the end surface portion to which the end cap 19 is mounted and the inner surface portion in which the rolling element rolling grooves 17L1 to 17R2 are formed. On the other hand, the rolling element cage 24 has a notch part 38 (refer to FIG. 15), which forms a relief portion with respect to the edge part 161 of the slider body 16, in one end portion and the other end portion of the rolling element holding parts 241, 242, and 243.

In the linear guide device configured as described above, the rolling element cage 24 has the two plate parts 244 facing to each other with the slider body 16 being held therebetween, so that the assembling ability of the rolling element cage 24 to the slider body 16 is improved and the strength of the rolling element cage 24 can be enhanced as compared with the case where the rolling element cage does not have plate parts. Also, deformation such as bend is less liable to occur on the rolling element cage 24, so that the ball 13 can be held surely. Furthermore, there is no need for resin molding the return guides 20 on the plate part 244 of the rolling element cage 24, so that the thickness of the rolling element cage 24 can be set at an optimum thickness such that deformation is less liable to occur. Thereby, the rolling element cage 24 can be resin molded with high accuracy. Also, since the return guides 20 are not molded integrally, there is no need for forming a thickness engraved part within the plate part 244 of the rolling element cage 24, so that the rolling element cage 24 can be resin molded using a mold having a simple shape.

Also, after the rolling element cages 24 have been assembled to the slider body 16, when the end caps 19 and the return guides 20 are mounted at one end and the other end of the slider body 16, the supply path for lubricating oil is formed between the return guide 20 and the plate part 244 of the rolling element cage 24 by the oil supply path forming groove 25 formed on the plate part 244 of the rolling element cage 24. Therefore, lubricating oil can be supplied to the balls 13 incorporated in the slider 12.

Further, when the positioning protrusions 27 of the end cap 19 are fitted in the rolling element passage forming parts 26 formed on the plate part 244 of the rolling element cage 24, the center of the rolling element passage forming part 26 coincides with the center of the direction change path 23. Thereby, a level difference that may cause vibrations and noise is restrained from occurring in the connection portion between the direction change path 23 and the rolling element return path 18. Therefore, the operability and noise characteristics can be improved.

Also, the positioning part of the cage and the rolling groove can be fabricated at the same time. By fabricating the positioning part of the cage and the rolling groove at the same time, the cage can be positioned with respect to the rolling element rolling groove with high accuracy, so that the assembling ability of linear guide device can be increased, and also the operability and noise characteristics can be improved.

Further, since the rolling element return passage forming member 33 can be inserted in rolling element return passage (through hole) 18 through the passage connection hole 28 provided in the plate part 244 of the rolling element cage 24, the rolling element return passage forming member 33 can be inserted in the rolling element return passage (through hole) 18 even after the rolling element cage 24 has been assembled to the slider body 16. Thereby, the assembling ability of the slider 12 can be improved.

Also, the distance L1 between the centers of the rolling element passage forming part 26 formed in the plate part 244 of the rolling element cage 24 and the passage connection hole 28 is shorter than the distance L2 between the centers of the rolling element rolling groove of the slider body 16 and the rolling element return path 18, so that the rolling element cage 24 is assembled to the slider body 16 in such a manner as to hold the thickness of the slider body 16 between the slider side rolling element rolling grooves 17L1 to 17R2 and the rolling element return path 18. Therefore, since resin-made parts such as the rolling element return passage forming members 33 can be fixed to the slider body 16 while keeping a balance by means of the rolling element return passage forming member 33 engaging with the plate part 244 of the rolling element cage 24, even if a dimensional error due to a sink mark at the time of resin molding of the rolling element cage 24 or the rolling element return passage forming member 33 or a positional shift of the rolling element return passage (through hole) 18 occurs, the force that pushes the rolling element return passage forming member 33 is determined according to the shift amount, and the resin parts are fixed to the slider body 16 automatically at a position such that the positional shift of the resin part is the smallest with respect to the rolling element return passage (through hole) 18. Therefore, the cages 24 and the rolling element return passage forming members 33 can be fixed to the slider body 16, and also the positional error of the rolling element return passage (through hole) 18 is adjusted automatically to make the positional shift as small as possible, by which further improvement of operability and noise characteristics can be realized easily. Also, since the positional accuracy of the rolling element return passage (through hole) 18 is relaxed, the linear guide device becomes advantageous in terms of productivity, and the cost thereof is reduced.

Also, if the positioning protrusions 30 and 32 provided on the return guide 20 are fitted in the passage connection hole 28 and the positioning through hole 31 formed in the plate part 244 of the rolling element cage 24 after the rolling element cage 24 has been assembled to the slider body 16, the center of the direction change path 23 coincides with the center of the passage connection hole 28. Thereby, even if a molding error is present on the rolling element cage 24, a level difference such as to hinder smooth rolling motion of the ball 13 does not occur in the rolling element circulation path of the slider 12, so that deteriorated noise characteristics and decreased operability caused by the molding error of the rolling element cage 24 can be prevented.

Also, since the distance L3 between the centers of the positioning protrusions 32 and 30 provided on the return guide 20 is made shorter than the distance L4 between the centers of the positioning through hole 31 provided in the plate part 244 of the rolling element cage 24 and the rolling element return passage 18, the rolling element holding parts 241 to 243 of the rolling element cage 24 are pressed to the inner surface side of the slider body 16 by the end cap 19. Thereby, the rolling element cage 24 is firmly fixed to the slider body 16. By appropriately setting the dimension difference between L3 and L4, the pressing force of the rolling element cage 24 to the slider body 16 can be changed. However, an excessive pressing force may deform or damage parts in the pressed portion. Considering the assembling ability, the dimension difference between L3 and L4 should preferably be 0.2 mm or smaller.

Also, the positioning protrusions 30 and 29 of the return guide 20 and the end cap 19 are molded integrally with the guide surface of the direction change path 23, and the rolling element return passage forming member 33 is inserted in the rolling element return passage (through hole) 18 in the slider body 16, by which the outer peripheral surface of the rolling element return passage forming member 33 is assembled by using the same through hole as a reference. Therefore, the guide surface of the direction change path 23 and the inner peripheral surface of the rolling element return passage forming member 33 can be connected to each other with high accuracy, so that the operability and noise characteristics can be improved further.

Furthermore, since the notch part 38, which forms a relief portion with respect to the edge part 161 of the slider body 16, is provided in the rolling element holding parts 241, 242 and 243 of the rolling element cage 24, the rolling element holding parts 241, 242 and 243 of the rolling element cage 24 do not interfere with the edge part 161 of the slider body 16. Therefore, deformation such as to deteriorate the noise characteristics and operability can be prevented from occurring on the rolling element cage 24.

Figure 16:
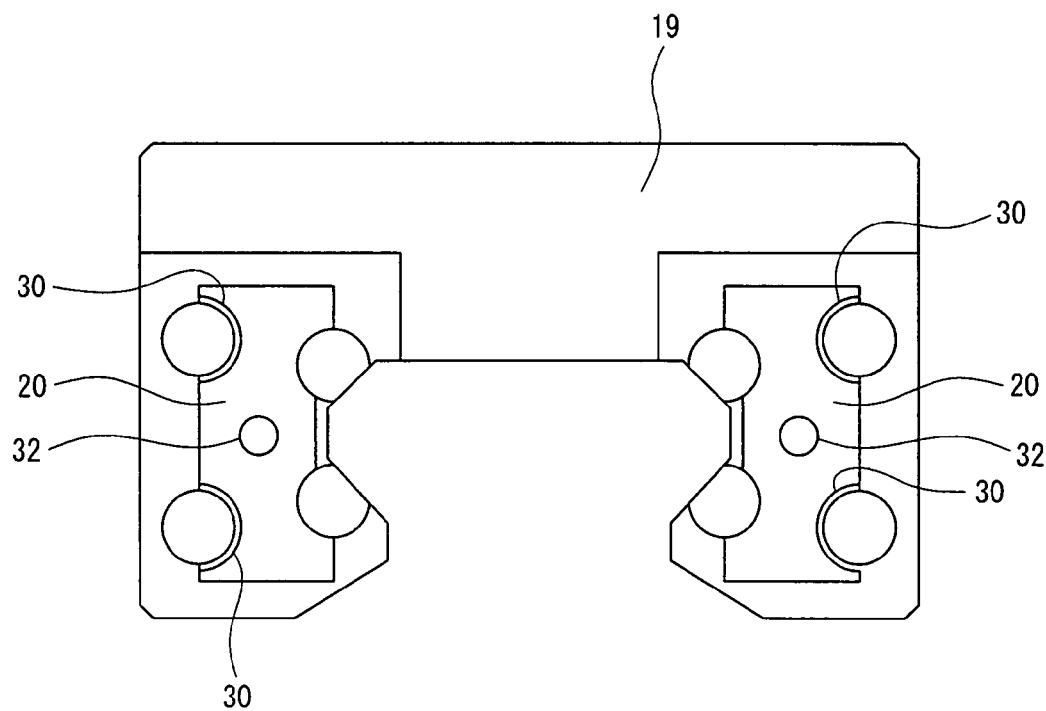
FIG. 16 is a back view of an end cap and a return guide in a linear guide device in accordance with a second embodiment of the present invention.

In the above-described first embodiment of the present invention, the positioning protrusions engaging with the passage connection holes 28 in the rolling element cage 24 are provided on both of the end cap 19 and the return guide 20. However, even if the positioning protrusions 30 engaging with the passage connection holes 28 in the rolling element cage 24 are formed on the return guide 20 only as shown in FIG. 16, the same effects can be obtained.

Figure 17:
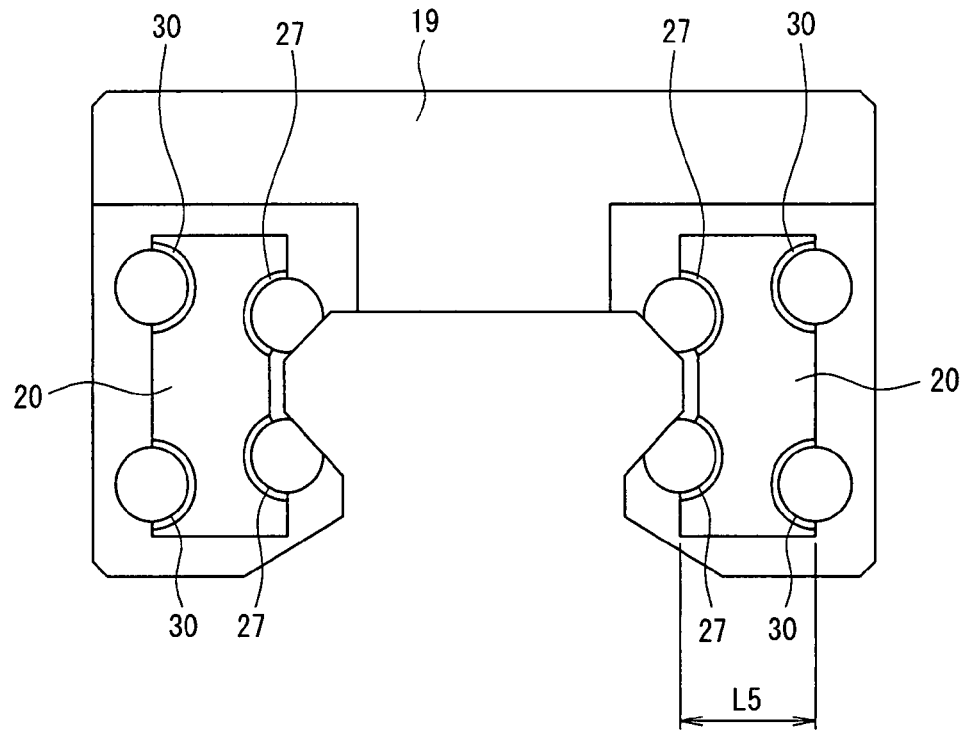
FIG. 17 is a back view of an end cap and a return guide in a linear guide device in accordance with a third embodiment of the present invention.
Figure 18:
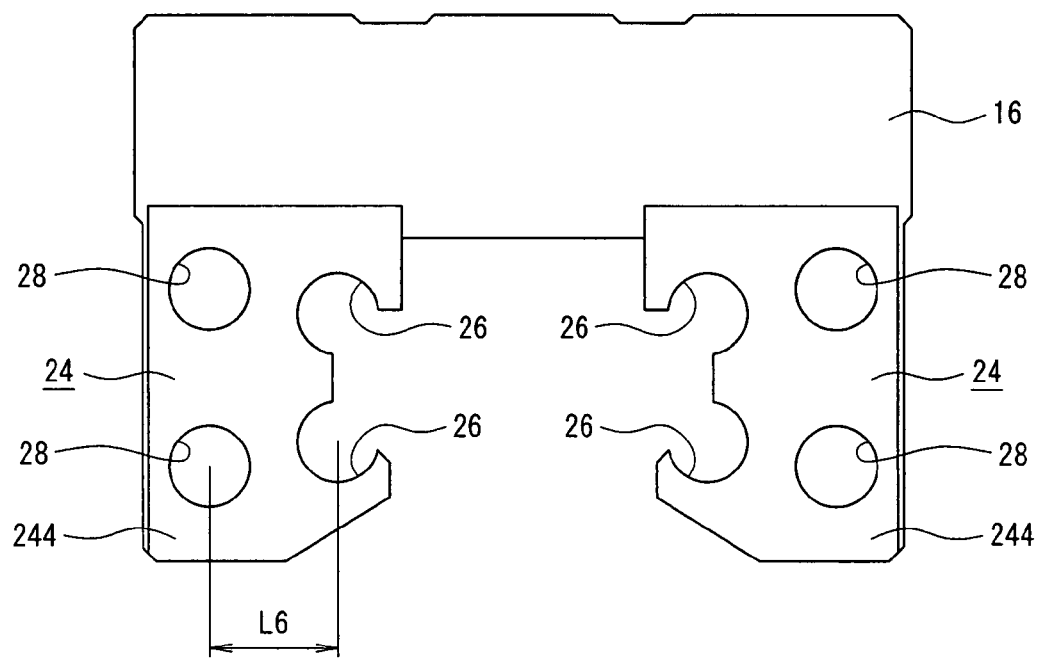
FIG. 18 is a view showing a slider body and a rolling element cage in a linear guide device in accordance with a third embodiment of the present invention.

Also, in the first embodiment of the present invention, a linear guide device in which the positioning protrusions 27 engaging with the rolling element passage forming parts 26 formed in the plate part 244 of the rolling element cage 24 are provided on the end cap 19 has been shown as an example. However, even if the positioning protrusions 27 engaging with the rolling element passage forming parts 26 are provided on the return guide 20 as shown in FIG. 17, the same effects can be obtained. In this case, taking the distance between the centers of the positioning protrusions of the return guide 20 as L5, the distance L6 (refer to FIG. 18) between the centers of the rolling element passage forming part 26 and the passage connection hole 28 formed in the plate part 244 of the rolling element cage 24 is preferably longer than L5 (L5<L6).

Figure 19:
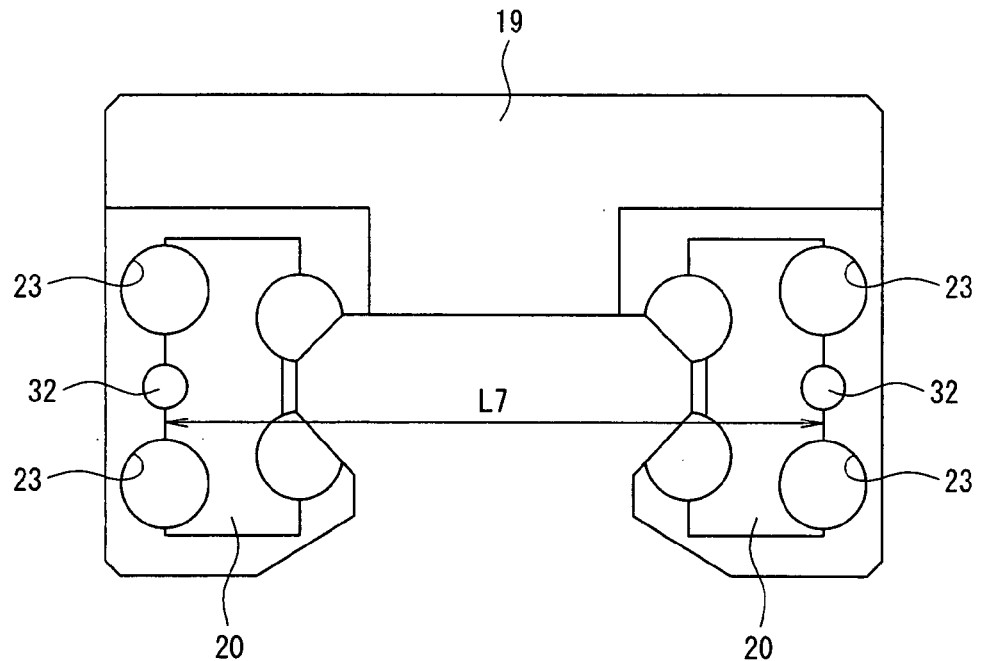
FIG. 19 is a back view of an end cap and a return guide in a linear guide device in accordance with a fourth embodiment of the present invention.
Figure 20:
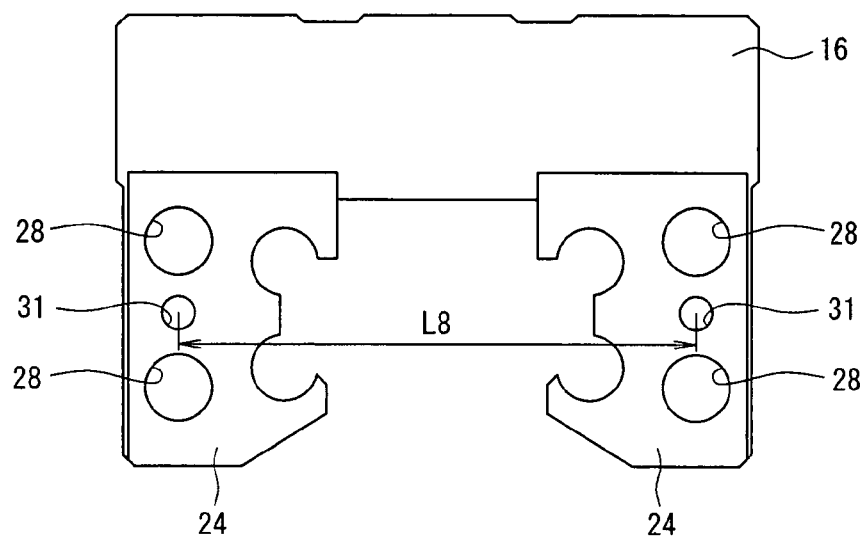
FIG. 20 is a view showing a slider body and a rolling element cage in a linear guide device in accordance with a fourth embodiment of the present invention.

Further, in the first embodiment of the present invention, a linear guide device in which the positioning protrusion 32 engaging with the positioning through hole 31 formed in the plate part 244 of the rolling element cage 24 is provided on the return guide 20 has been shown as an example. However, even if the positioning protrusions 32 are provided on the end cap 19 as shown in FIG. 19, the same effects can be obtained. In this case, taking the space between the positioning protrusions 32 provided on the end cap 19 as L7, the positioning protrusions 32 are preferably provided on the end cap 19 so that the space L8 between the positioning through hole 31 provided in one rolling element cage 24 and the positioning through hole 31 provided in the other rolling element cage 24 as shown in FIG. 20 is narrower than L7 (L7>L8).

Figure 10:
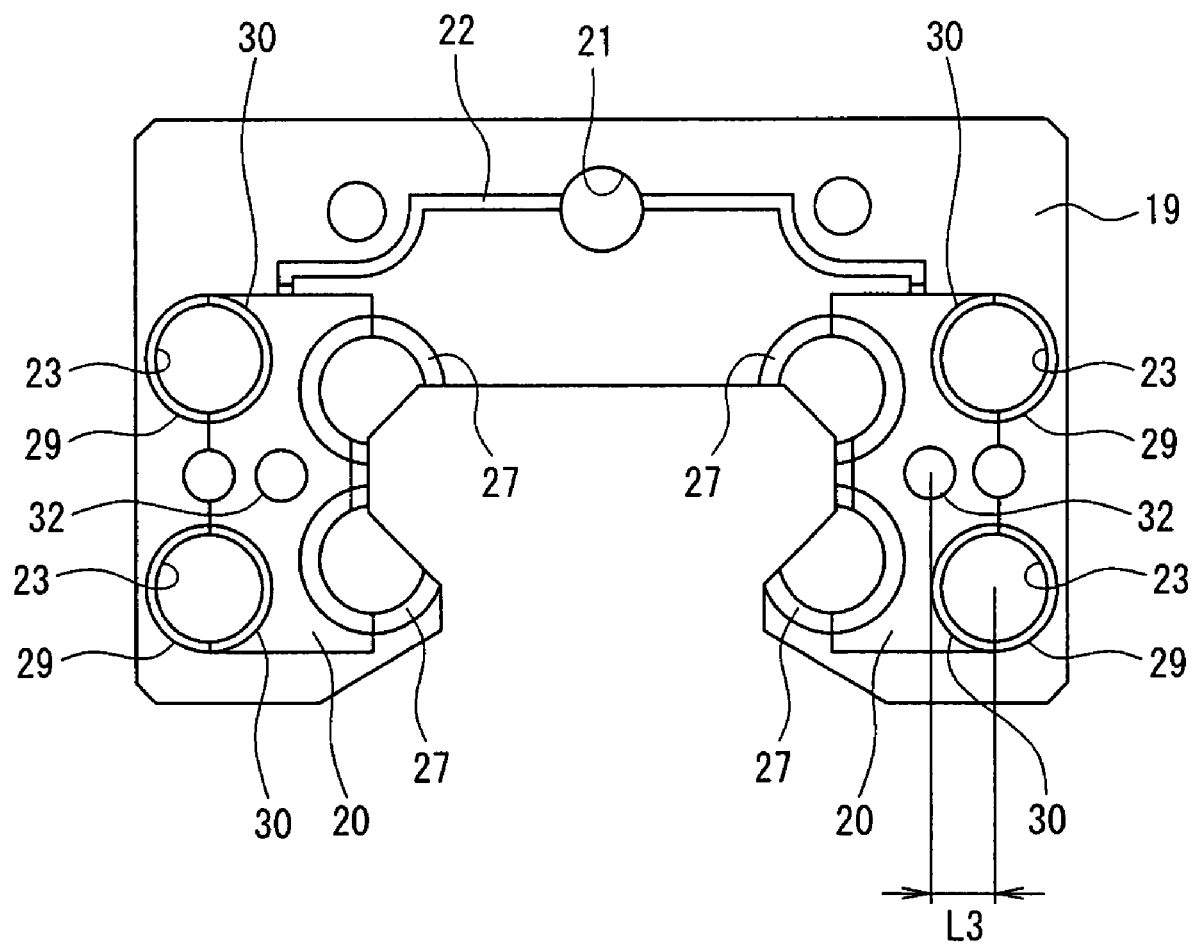
FIG. 10 is a back view of an end cap and a return guide shown in FIG. 9.
Figure 21:
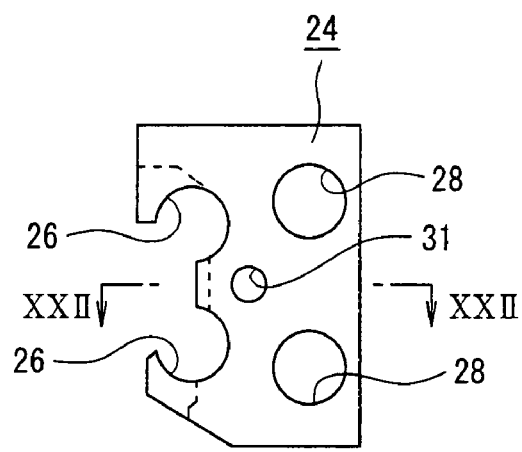
FIG. 21 is a side view of a rolling element cage in a linear guide device in accordance with a fifth embodiment of the present invention.
Figure 22:
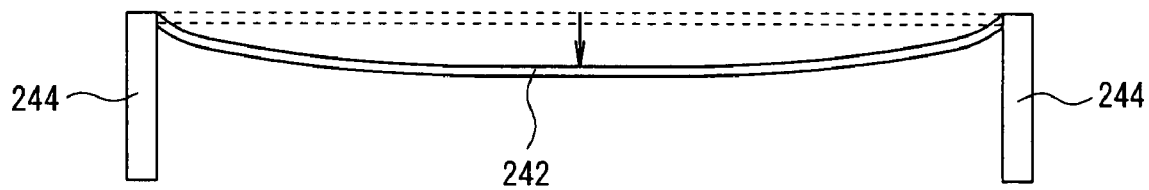
FIG. 22 is a sectional view taken along the line XXII-XXII of FIG. 21.

In the embodiment shown in FIGS. 10 and 12, the distance L3 between the centers of the positioning protrusions 32 and 30 provided on the return guide 20 is made shorter than the distance L4 between the centers of the positioning through hole 31 provided in the plate part 244 of the rolling element cage 24 and the rolling element return passage 18 to press the rolling element holding parts 241 to 243 of the rolling element cage 24 against the inner surface portion of the slider body 16 on which the slider side rolling element rolling grooves are formed. However, as shown in FIGS. 21 and 22, the rolling element holding parts 241 to 243 may be molded into a shape curved in a convex shape with respect to the inner surface portion of the slider body 16.

Figure 23A:
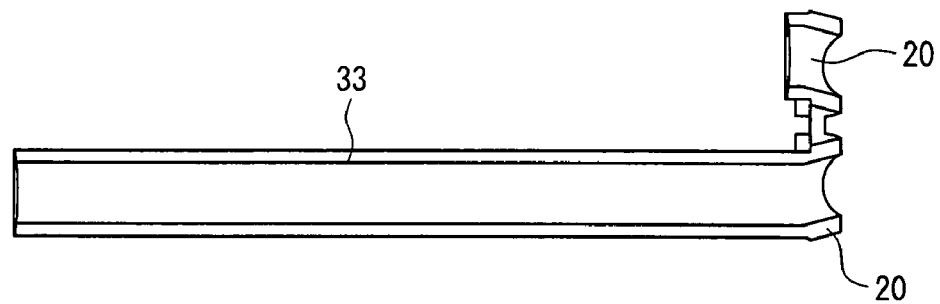
FIGS. 23A and 23B are views for illustrating a sixth embodiment of the present invention.
Figure 23B:
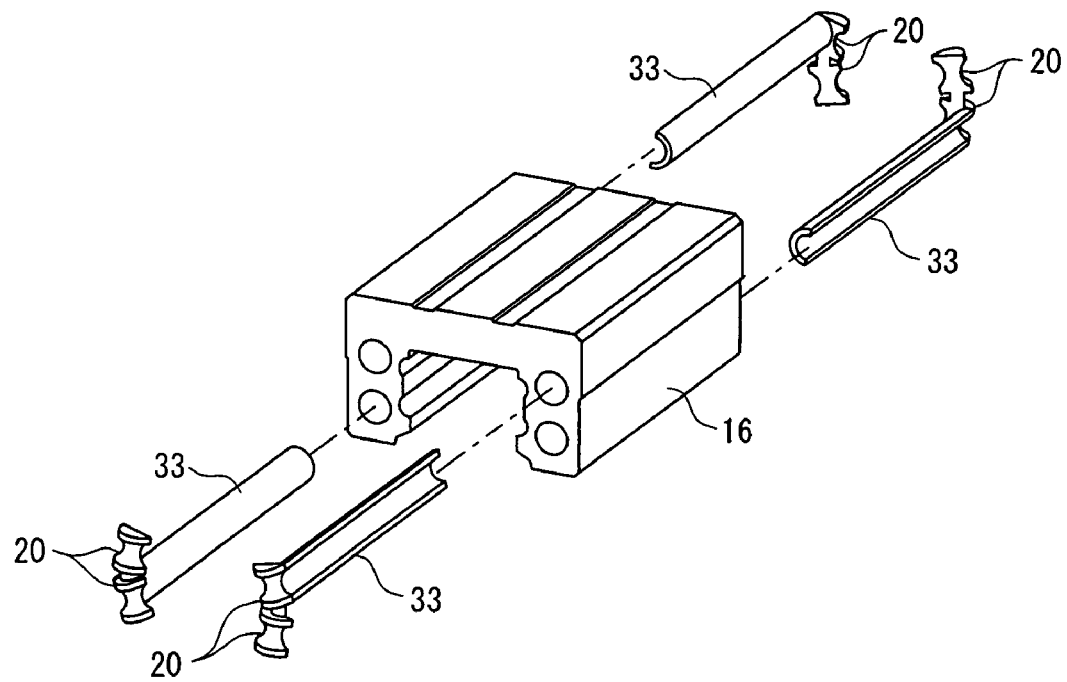

In the above-described first embodiment of the present invention, a linear guide device in which the rolling element return passage forming member 33 inserted in the rolling element return passage (through hole) 18 is of a cylindrical shape has been shown as an example. However, for example, as shown in FIGS. 23A and 23B, a member resin molded into a semicylindrical shape may be used as the rolling element return passage forming member 33. In this case, as shown in FIGS. 23A and 23B, it is preferable in terms of the reduced number of parts and reduced cost that the return guide 20 be resin molded integrally with the semicylindrical rolling element return passage forming member 33. Also, in this case, it is preferable that the semicylindrical rolling element return passage forming members 33 integrated with the return guides 20 be inserted in the rolling element return passages 18 from one end and the other end of the slider body 16 in such a manner that the upper and lower rolling element return passages 18 complement each other so that one end and the other end of the rolling element return passage forming member 33 are close to one end and the other end of the slider body 16.

Figure 24:
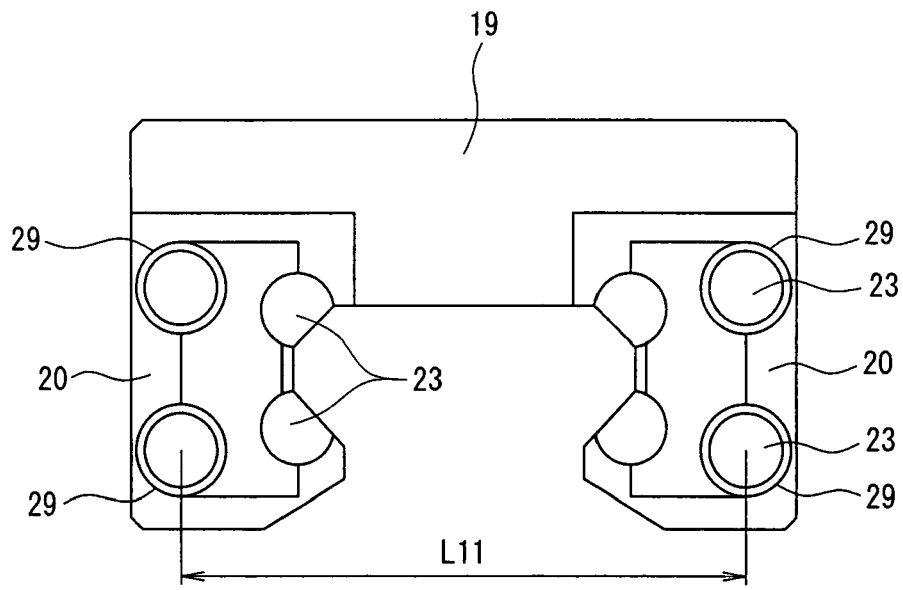
FIG. 24 is a back view of an end cap in a linear guide device in accordance with a seventh embodiment of the present invention.
Figure 25:
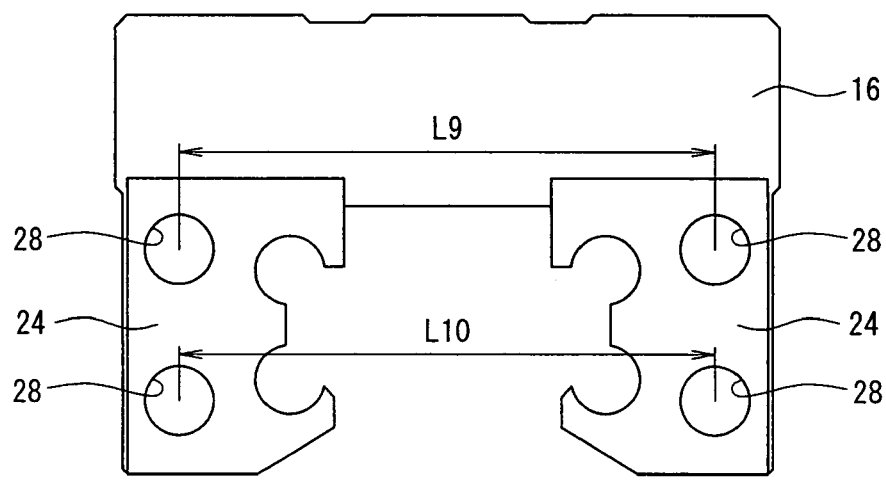
FIG. 25 is a view showing a slider body and a rolling element cage in a linear guide device in accordance with a seventh embodiment of the present invention.

FIGS. 24 and 25 show a seventh embodiment of the present invention. The seventh embodiment differs from the embodiment shown in FIGS. 19 and 20 in that the distance L11 (refer to FIG. 24) between the centers of the positioning protrusions 29 provided on the left-hand side and the right-hand side of the end cap 19 is made longer than the distance L10 (refer to FIG. 25) between the centers of the passage connection hole 28 formed in the plate part 244 of one rolling element cage 24 of the two rolling element cages 24 and the passage connection hole 28 formed in the plate part 244 of the other rolling element cage 24, and the dimension L9 between the end cap positioning parts on the slider body side is made equal to L11 (L10<L11, L9=L11).

In such a configuration, the rolling element holding parts 241 to 243 of the rolling element cage 24 are pressed against the inner surface portion of the slider body 16 in which the slider side rolling element rolling groove is formed by the end cap 19, and the end cap 19 is positioned at all of four places of the rolling element return passages 18 formed in the slider body 16. Therefore, the operability, noise characteristics, and productivity can be improved further, and also the cost can be reduced further.

The invention claimed is:

1. A linear guide device comprising:
  a guide rail formed into a straight line shape;
  a slider relatively moving in the lengthwise direction of the guide rail; and
  a large number of rolling elements rollably incorporated in the slider, the slider including a slider body having a plurality of slider side rolling element rolling grooves facing to a plurality of rail side rolling element rolling grooves formed on the guide rail;
  a pair of end caps mounted at one end and the other end of the slider body;
  a plurality of return guides that form between the end caps and the slider body a direction change path communicating with a rolling element load rolling path formed between each rail side rolling element rolling groove and a corresponding slider side rolling element rolling groove and communicating with a rolling element return passage formed in the slider body; and a pair of rolling element cages for holding the rolling elements interposed between the rail side rolling element rolling grooves and the slider side rolling element rolling grooves, wherein each rolling element cage has two plate parts facing to each other with the slider body being held therebetween;
  wherein a rolling element holding part of each rolling element cage has at least one notch part or a concave part in the lengthwise direction of the rolling element holding part; and 2. The linear guide device according to claim 1, wherein each plate part of the rolling element cage forms a supply path for lubricating oil between one of the return guides and that plate part.

3. The linear guide device according to claim 1, wherein each rolling element cage has a positioning part which makes contact with or engages with at least one of the slider body, one of the end caps, and one of the return guides.

4. The linear guide device according to claim 1, further comprising a semicylindrical or cylindrical rolling element return passage forming member provided in the rolling element return passage formed in the slider body.

5. The linear guide device according to claim 4, wherein each of the rolling element cages has a positioning part with respect to the rolling element return passage forming member.

6. The linear guide device according to claim 4, wherein each the rolling element cage has a positioning part which makes contact with an inner surface portion of the slider body that is formed with at least one of the slider side rolling element rolling grooves and a positioning part which makes contact with or engages with at least one of the end caps, at least one of the return guides, and the rolling element return passage forming member.

7. The linear guide device according to claim 4, wherein the rolling element return passage forming member has a positioning part with respect to the slider body.

8. The linear guide device according to claim 4, wherein at least one of the return guides is molded integrally with the rolling element return passage forming member.

9. The linear guide device according to claim 1, wherein the slider side rolling element rolling grooves are formed on an upper portion and a lower potion of an inside surface of the slider body, and each rolling element cage has at least one of a part arranged on the upper side of the rolling element rolling groove formed on the upper portion of the inside surface of the slider body, a part arranged between the rolling element rolling groove formed on the upper portion of the inside surface of the slider body and the rolling element rolling groove formed in the lower portion of the inside surface of the slider body, and a part arranged on the lower side of the rolling element rolling groove formed on the lower portion of the inside surface of the slider body.

10. The linear guide device according to claim 1, wherein each rolling element cage has a plurality of rolling element holding parts formed in parallel with each other along the slider side rolling element rolling groove.

11. The linear guide device according to claim 1, wherein each end cap has a positioning part with respect to the slider body.

12. The linear guide device according to claim 11, wherein at least a part of the rolling element holding part of each rolling element cage makes contact with an inner surface portion of the slider body.

13. The linear guide device according to claim 1, wherein at least one of the return guides has a positioning part with respect to the slider body.

14. A linear guide device comprising:
a guide rail formed into a straight line shape;
a slider relatively moving in the lengthwise direction of the guide rail; and
a large number of rolling elements rollably incorporated in the slider, wherein the slider includes
   a slider body having a slider side rolling element rolling grooves facing to a plurality of rail side rolling element rolling grooves formed on the guide rail, and a plurality of rolling element return passages formed in parallel with each other along the slider side rolling element rolling grooves;
a pair of end caps mounted at the slider body in such a manner that the rolling element return passages complement each other;
a plurality of return guides that form between the end caps a convex path communicating with both a rolling element load rolling path formed between one of the rail side rolling element rolling grooves and one of the slider side rolling element rolling grooves, and the rolling element return passages; and
a plurality of rolling element return passage forming members inserted in the rolling element return passages; wherein
two return guides, among the plurality of return guides, incorporated in upper and lower portions of the end caps are resin molded integrally with the rolling element return passage forming members;
at least one of the rolling element return passage forming members is resin molded into a semicylindrical shape; and
the rolling element return passage forming members protrude beyond ends of the slider body.

* * * * *